United States Patent
Marazzani et al.

(10) Patent No.: US 9,133,057 B2
(45) Date of Patent: *Sep. 15, 2015

(54) DIALKANOLAMINES AS ADDITIVES FOR GRINDING SOLIDS

(71) Applicant: SIKA TECHNOLOGY AG, Baar (CH)

(72) Inventors: Beat Marazzani, Oberengstringen (CH); Christian Bürge, Schafisheim (CH); Christophe Kurz, Endingen (CH); Thomas Müller, Heidelberg (DE)

(73) Assignee: SIKA TECHNOLOGY AG, Barr (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/090,375

(22) Filed: Nov. 26, 2013

(65) Prior Publication Data

US 2014/0150694 A1 Jun. 5, 2014

Related U.S. Application Data

(63) Continuation of application No. PCT/EP2012/059906, filed on May 25, 2012.

(30) Foreign Application Priority Data

May 26, 2011 (EP) .................................... 11167673

(51) Int. Cl.
| | | |
|---|---|---|
| *C04B 16/00* | (2006.01) | |
| *C04B 24/12* | (2006.01) | |
| *C04B 28/02* | (2006.01) | |
| *C04B 103/52* | (2006.01) | |

(52) U.S. Cl.
CPC ............... *C04B 16/00* (2013.01); *C04B 24/122* (2013.01); *C04B 28/02* (2013.01); *C04B 2103/52* (2013.01); *Y02W 30/92* (2015.05); *Y02W 30/94* (2015.05)

(58) Field of Classification Search
CPC .............................. C04B 2103/52; C04B 7/42
See application file for complete search history.

(56) References Cited

U.S. PATENT DOCUMENTS

| | | | |
|---|---|---|---|
| 4,943,323 A | | 7/1990 | Gartner et al. |
| 4,990,190 A | | 2/1991 | Myers et al. |
| 5,017,234 A | | 5/1991 | Gartner et al. |
| 5,084,103 A | | 1/1992 | Myers et al. |
| 5,156,679 A | * | 10/1992 | Gartner et al. ............... 106/808 |
| 5,348,583 A | | 9/1994 | Arfaei et al. |
| 5,429,675 A | * | 7/1995 | Cheung et al. ............... 106/802 |
| 6,048,393 A | | 4/2000 | Cheung et al. |
| 6,290,772 B1 | | 9/2001 | Cheung et al. |
| 6,358,311 B1 | | 3/2002 | Arai et al. |
| 2004/0244655 A1 | | 12/2004 | Buerge et al. |
| 2006/0086291 A1 | | 4/2006 | Jardine |
| 2009/0050023 A1 | | 2/2009 | Buerge et al. |
| 2014/0076203 A1 | | 3/2014 | Marazzani et al. |
| 2014/0076205 A1 | | 3/2014 | Marazzani et al. |

FOREIGN PATENT DOCUMENTS

| | | |
|---|---|---|
| CN | 1107127 A | 8/1995 |
| CN | 1223235 A | 7/1999 |
| EP | 0 415 799 A2 | 3/1991 |
| EP | 1 348 729 A1 | 10/2003 |
| EP | 1 138 697 B1 | 11/2003 |
| EP | 1 061 089 B1 | 3/2004 |
| EP | 1 561 735 A1 | 8/2005 |
| KR | 10-0893585 B1 | 4/2009 |
| WO | WO 03/000617 A1 | 1/2003 |
| WO | WO 2005/123621 A1 | 12/2005 |
| WO | WO 2011022217 A1 * | 2/2011 |
| WO | WO 2012/160211 A1 | 11/2012 |

OTHER PUBLICATIONS

"How to Sculpt with Concrete". WikiHow. May 2, 2008 [Retrieved on Sep. 13, 2014]. Retrieved from http://web.archive.org/web/20080502193504/http://www.wikihow.com/Sculpt-With-Concrete.*
Notification of Transmittal of Translation of International Preliminary Report on Patentability (Forms PCT/IB/338 and PCT/IB/373) and the Written Opinion of the International Searching Authority (Form PCT/ISA/237) issued on Dec. 5, 2013, by the International Bureau of WIPO in corresponding International Application No. PCT/EP2012/059904. (7 pages).
Notification of Transmittal of Translation of the International Preliminary Report on Patentability (PCT/IB/338 and PCT/IB/373) and the Written Opinion of the International Searching Authority (Form PCT/ISA/237) issued on Dec. 5, 2013, by the International Bureau of WIPO in corresponding International Application No. PCT/EP2012/059906. (9 pages).
Notification of Transmittal of Translation of International Preliminary Report on Patentability (Forms PCT/IB/338 and PCT/IB/373) and the Written Opinion of the International Searching Authority (Form PCT/ISA/237) issued on Dec. 5, 2013, by the International Bureau of WIPO in corresponding International Application No. PCT/EP2012/059908. (8 pages).
International Search Report (PCT/ISA/210) mailed on Aug. 6, 2012, by the European Patent Office as the International Searching Authority for International Application No. PCT/EP2012/059906.
Written Opinion (PCT/ISA/237) mailed on Aug. 6, 2012, by the European Patent Office as the International Searching Authority for International Application No. PCT/EP2012/059906.
International Search Report (PCT/ISA/210) mailed on Aug. 6, 2012 by the European Patent Office as the International Searching Authority for International Application No. PCT/EP2012/059904.
Written Opinion (PCT/ISA/237) mailed on Aug. 6, 2012, by the European Patent Office as the International Searching Authority for International Application No. PCT/EP2012/059904.

(Continued)

*Primary Examiner* — Kaj K Olsen
*Assistant Examiner* — Karam Hijji
(74) *Attorney, Agent, or Firm* — Buchanan Ingersoll & Rooney PC

(57) ABSTRACT

The present disclosure relates to the use of an amino alcohol A and/or of a salt of the amino alcohol A as an additive when grinding at least one solid. The amino alcohol A has a structure according to formula I where: $R^1$ and $R^2$, independently of one another, each present an alkanol group including 2-4 carbon atoms, and b) $R^3$ is a hydrocarbon group including 1-8 carbon atoms, and c) $R^3$ is different from $R^1$ and/or $R^2$.

30 Claims, No Drawings

(56) References Cited

OTHER PUBLICATIONS

International Search Report (PCT/ISA/210) mailed on Aug. 6, 2012, by the European Patent Office as the International Searching Authority for International Application No. PCT/EP2012/059908.
Written Opinion (PCT/ISA/237) mailed on Aug. 6, 2012, by the European Patent Office as the International Searching Authority for International Application No. PCT/EP2012/059908.
Chinese Office Action issued in Chinese Patent Application No. 201280019856.2 dated Jan. 6, 2015, 9 pages.
Chinese Office Action issued in Chinese Patent Application No. 201280019835.0 dated Feb. 25, 2015, 7 pages.
Office Action issued in copending U.S. Appl. No. 14/090,639 dated Dec. 3, 2014.
Office Action issued in copending U.S. Appl. No. 14/090,511 dated Nov. 20, 2014.
U.S. Appl. No. 14/090,511, filed Nov. 26, 2013 naming as inventors Beat Marazzani et al.
U.S. Appl. No. 14/090,639, filed Nov. 26, 2013 naming as inventors Beat Marazzani et al.
Office Action issued in copending U.S. Appl. No. 14/090,639 dated Apr. 23, 2015.
Office Action issued in copending U.S. Appl. No. 14/090,511 dated Apr. 14, 2015.

\* cited by examiner

DIALKANOLAMINES AS ADDITIVES FOR GRINDING SOLIDS

RELATED APPLICATION(S)

This application claims priority as a continuation application under 35 U.S.C. §120 to PCT/EP2012/059906, which was filed as an International Application on May 25, 2012 designating the U.S., and which claims priority to European Application No. 11167673.0 filed in Europe on May 26, 2011. The entire contents of these applications are hereby incorporated by reference in their entireties.

FIELD

The disclosure relates to the use of an amino alcohol A and/or of a salt of the amino alcohol A as an additive when grinding at least one solid, for example, an inorganic and/or mineral solid. The disclosure also relates to a composition, a cured molded article and a method for producing a binder composition.

BACKGROUND INFORMATION

A central step and a cost factor in the manufacturing of mineral binders, for example, cement, is that of grinding the large-particle mineral components into fine powder. During cement manufacturing, for example, clinker and, depending on the type of cement being manufactured, optionally also additives such as granulated slag or limestone, are ground into a fine powder. In this process, cement and additives can basically be ground together or separately.

The fineness of the mineral binder can be an important quality characteristic in this process. For example, cured mortar or concrete mixtures with fine-ground mineral binders generally have higher compressive strengths than corresponding mixtures on the basis of more coarsely ground mineral binders.

To facilitate the comminution of mineral binders in mills and to prevent agglomeration of the resulting powder particles, so-called grinding aids may be used. Grinding aids can bring about a marked reduction in the grinding time and in the energy input necessary for grinding. Since the 1960s, organic liquids, for example, glycols and amino alcohols, as well as mixtures thereof have provided good results as grinding aids. They are placed in the cement mill along with the material to be ground in quantities of up to about 0.1% of this material. In this way, the throughput of the mills can be increased by 20 to 30%, in some plants even by as much as 50%, at the same fineness and identical Blaine value of the cement.

So-called cement conditioners can also be used. These are substances which increase, for example, the compressive strengths of mortar or cement mixtures after curing. As a result, it is possible to achieve compressive strengths with less finely ground mineral binders comparable to those with more finely ground binders. Correspondingly, the mill throughputs can also be increased by the use of cement conditioners.

U.S. Pat. No. 5,084,103 (David F. Myers, W.R. Grace & Co.) in this connection describes for example, grinding aids and cement conditioners based on higher trialkanolamines such as triisopropanolamine, N,N-bis(2-hydroxyethyl)-N-2-hydroxypropyl)amine and tris(2-hydroxybutyl)amine.

A need exists for new and improved additives for the grinding of solids, for example, in the manufacturing of mineral binders.

SUMMARY

According to an exemplary aspect, a composition is provided, comprising: a solid, and an amino alcohol A and/or a salt of the amino alcohol A, as an additive in the grinding the solid, wherein the amino alcohol A has a structure according to Formula I:

wherein a) $R^1$ and $R^2$ each independently represents an alkanol group having 2-4 carbon atoms, and b) $R^3$ is an organic radical having 1-8 carbon atoms, and c) $R^3$ is different from $R^1$ and/or $R^2$.

According to another exemplary aspect, a molded article obtained by curing an exemplary composition is provided.

According to another exemplary aspect, a method for producing an exemplary composition is provided, the method comprising: mixing the amino alcohol A and/or a salt of the amino alcohol A with the solid, and grinding the solid, wherein the mixing occurs before and/or during the grinding.

According to another exemplary aspect, a method for grinding a solid is provided, the method comprising: grinding a composition comprising: a solid, and an amino alcohol A and/or a salt of the amino alcohol A, wherein the amino alcohol A has a structure according to Formula I:

wherein a) $R^1$ and $R^2$ each independently represents an alkanol group having 2-4 carbon atoms, and b) $R^3$ is an organic radical having 1-8 carbon atoms, and c) $R^3$ is different from $R^1$ and/or $R^2$.

DETAILED DESCRIPTION

Provided is an improved additive for the grinding of solids, for example, inorganic and/or mineral solids, for example, cementitious binders. The additive can be usable as grinding aids to increase the grinding efficiency in processes involving the grinding of solids, for example, mineral binders. For example, the additive can improve the material properties of the solids and, for example, act as cement improvers.

According to an exemplary aspect, provided is the use of an amino alcohol A of Formula I

and/or a salt of the amino alcohol A as an additive in the grinding of solids, for example, an inorganic and/or mineral solid, for example, during the manufacturing of cementitious binders, wherein
a) $R^1$ and $R^2$ each independently represent an alkanol group having 2-4 carbon atoms, and
b) $R^3$ is an organic radical having 1-8 carbon atoms, and
c) $R^3$ is different from $R^1$ and/or $R^2$.

As was surprisingly found during grinding studies, compared to comparative additives, increased grinding efficiency can be achieved with the same grinding time using the amino alcohol A or salts thereof according to the disclosure compared with comparative additives. This can be true for mineral binders, for example, cementitious binders. Thus, at the same dosage and the same grinding time, a distinctly finer powder with a substantially larger surface area or a larger Blaine value can be obtained with the amino alcohols A and/or salts thereof in the grinding of solids, for example, mineral materials. In addition, the sieve residue can also be reduced significantly, which again benefits the grinding efficiency.

It was also found that the properties of the solids can be improved with the amino alcohols A according to the disclosure and/or salts thereof. In this case, a large fraction of the substances withstands the grinding process essentially intact, and may improve the properties of the ground solids also after the grinding process. Since the amino alcohols A or salts thereof are mixed and ground with the solid during the grinding process, a particularly uniform distribution can be achieved. This cannot be achieved to an equal extent by subsequent addition of the amino alcohols A and/or salts thereof. For example, the amino alcohols A according to the disclosure and/or salts thereof can be used as cement improvers during the grinding of cementitious binders. The compressive strengths of mortar and concrete mixtures containing cementitious binders treated in this way can be significantly higher in comparison with cementitious binders that were ground without amino alcohols A and/or salts thereof.

In general, the amino alcohols A and/or salts thereof can be used as additives, for example, as grinding aids and/or cement improvers, in the grinding of various mineral binders. This can, for example, involve cementitious binders such as various cement types (CEM I, CEM II, CEM III, CEM IV, CEM V, so-called "green cements" and belite cements), for ready-mixed, in situ, pre-cast concretes and shotcrete, as well as mortar application such as repair mortar, grout, spray mortar or the like. For example, the processability of the mineral binders is scarcely or not at all negatively influenced by the addition of the amino alcohols A according to the disclosure and/or salts thereof.

In addition the amino alcohols A and/or salts thereof are also compatible with a large number of other additives and process chemicals used in the grinding of solids. The amino alcohols A and/or salts thereof thus can be used flexibly in the grinding of solids.

A first exemplary aspect of the present disclosure relates to the use of an amino alcohol A as an additive in the grinding of at least one solid, for example, an inorganic and/or mineral solid, wherein the amino alcohol A has a structure according to Formula I:

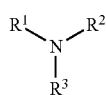

(I)

and wherein
a) $R^1$ and $R^2$ each independently represent an alkanol group having 2-4 carbon atoms, and
b) $R^3$ is an organic radical having 1-8 carbon atoms, and
c) $R^3$ is different from $R^1$ and/or $R^2$.

The term "grinding" or "grinding process" refers to a method in which the mean particle size of a solid or a mixture of various solids is reduced. This is accomplished, for example, in a mill during the grinding of clinker, optionally together with inert and/or active additives, for example gypsum, anhydrite, α-hemihydrate, β-hemihydrate, latently hydraulic binders, pozzolanic binders and/or inert fillers. For example, the solid or the mixture of various solids, for example, a mineral binder, is ground to a Blaine value of at least 500 $cm^2/g$, for example, at least 1,000 $cm^2/g$, for example, at least 2,000 $cm^2/g$, for example, at least 2,500 $cm^2/g$. The grinding process or the grinding of the solid can take place at temperatures of less than 300° C., for example, less than 150° C., for example, less than 110° C. Exemplary temperatures are between 30-110° C., for example, 80-105° C.

A "solid" in the current context can be an inorganic and/or mineral solid. For example, the solid is an inorganic substance for use in construction, for example, as a constituent of cement, mortar, or concrete compositions. The solid can be a mineral binder and/or an additive for a mineral binder. The solid can basically be present in coarse form, e.g., as (unground) clinker and/or already partially ground.

A "mineral binder" in this connection can be a binder, for example, an inorganic binder, which reacts in the presence of water to form solid hydrates or hydrate phases in a hydration reaction. For example, this can be a hydraulic binder (e.g., cement or hydraulic lime), a latently hydraulic binder (e.g., slag or granulated slag), a pozzolanic binder (e.g., fly ash, trass or rice husk ash) and/or a nonhydraulic binder (gypsum or white lime). Mixtures of the various binders are also possible.

An "additive for a mineral binder," for example, is an inert mineral substance such as limestone, silica flour and/or pigments.

In the present case, a "cementitious binder" is, for example, a binder or a binder composition containing at least 5 wt %, for example, at least 20 wt %, for example, at least 35 wt %, for example, at least 65 wt % of cement clinker.

The term "organic radical having 1-8 carbon atoms" can represent linear or branched hydrocarbon radicals having 1-8 C atoms, which optionally may contain 1 or more heteroatoms and/or optionally one or more C—C multiple bonds and/or optionally cycloaliphatic and/or aromatic portions. Heteroatoms that may be present can be N, O, P, S and/or Si.

An "alkanol group" in the present case has one or more hydroxyl groups on a saturated alkyl radical having 2-4 carbon atoms. The alkanol group can have exactly one hydroxyl group. The alkyl radical may basically be linear or branched. The hydroxyl groups may basically be present as primary and/or secondary OH groups. The alkanol groups can be bound to the N atom of the amino alcohol A via a carbon atom.

According to an exemplary embodiment of the disclosure, the amino alcohol A and/or a salt thereof is used as a grinding aid for improving the grinding efficiency when grinding a mineral substance, for example, when grinding a mineral binder. The amino alcohols A and/or salts thereof can be suitable as grinding aids in the grinding of cementitious binders or cement clinker.

In another exemplary embodiment, the amino alcohol A and/or a salt thereof is used as auxiliary for improving the material properties of the solid, for example, for improving cement properties when grinding cementitious binders or cement clinker. The amino alcohols A and/or salts thereof can be suitable as cement improvers for increasing the strength class of the cement or for increasing the compressive strength and/or the bending tensile strength of mortar and/or concrete mixtures. In this way, for example, it is possible to produce cements with higher compressive strengths at comparable bending tensile strengths compared with more finely ground cement after 1-28 days, for example, after 2, 7 and 28 days, in mortar and/or concrete mixtures. This can be advantageous in that cement clinker may be ground more coarsely when the amino alcohols A and/or the salts thereof are used according to the disclosure and nevertheless strength classes similar to those for more finely ground cements can be achieved. Correspondingly, the energy and time required for grinding can be reduced and the mill throughput increased.

The amino alcohol A and/or salt thereof can be used for improving the early compressive strength of a mineral binder and/or the mortar and/or concrete mixture.

It is also possible to use the amino alcohol A and/or salt thereof simultaneously as a grinding aid and as an auxiliary for improving the material properties of the solid. This can be the case with cementitious binders.

As has been found, the use of the amino alcohol A and/or salt thereof can be advantageous if the solid includes or consists of a hydraulic binder, for example, cement and/or cement clinker. An exemplary cement is a cement with a cement clinker fraction of ≥35 wt %. For example, the cement is of type CEM I, CEM II and/or CEM IIIA (according to the standard EN 197-1). A fraction of the hydraulic binder in the total solid can amount to at least 5 wt %, for example, at least 20 wt %, for example, at least 35 wt %, for example, at least 65 wt %. According to an exemplary embodiment, the solid consists of ≥95 wt % hydraulic binder, for example, cement clinker.

However, applications are also possible, for example, in which the solid contains or consists of other binders. These can be latently hydraulic binders and/or pozzolanic binders. Suitable latently hydraulic and/or pozzolanic binders are, for example, slag and/or fly ash. In an exemplary embodiment, the solid contains 5-95% wt %, for example, 5-65 wt %, for example, 15-35 wt %, latently hydraulic and/or pozzolanic binders. Also possible are ≥95 wt % of latently hydraulic and/or pozzolanic binders in the solid.

Likewise, the amino alcohol A and/or salt thereof can also be used in grinding inert solids, e.g., mineral materials, for example, limestone flour, silica flour and/or pigments.

The amino alcohol A or salt thereof can be used with solids which include a mixture of a hydraulic binder, for example, cement clinker, and a latently hydraulic and/or pozzolanic binder, for example, slag or fly ash. The fraction of the latently hydraulic and/or pozzolanic binder in this case can amount to 5-95 wt %, for example, 5-65 wt %, for example, 15-35 wt %, while at least 35 wt %, for example, at least 65 wt %, of the hydraulic binder is present. Furthermore, an inert substance, e.g., limestone, may be present in the mixture. Such mixtures, for example, may be used after grinding as binder components in mortar and concrete mixtures.

For example, the amino alcohol A and/or salt thereof may be added to the solid before and/or during a grinding process of the solid. In an exemplary embodiment the addition takes place before the grinding process.

The amino alcohol A and/or the salt of the amino alcohol A can be used, for example, as the pure substance, for example, with a purity of ≥95 wt %.

For example, the amino alcohol A and/or the salt of the amino alcohol A is used in liquid form, for example, as a solution or dispersion. Aqueous solutions and/or dispersions with a fraction of the amino alcohol A and/or its salt of 5-99 wt %, for example, 20-70 wt %, for example, 30-50 wt % are exemplary. In this way, optimal mixing with the material being ground is achieved.

Basically, however, the amino alcohol A and/or the salt of the amino alcohol A can also be used in solid form, for example as a powder, and/or applied to a solid support material.

According to an exemplary variant a $C_1$- to $C_3$-carboxylic acid salt of the amino alcohol A is used, for example, an acetic acid salt of the amino alcohol A. Also exemplary is a formate salt of the amino alcohol A. In this way, among other things, it is possible to reduce odor emissions without appreciably impairing the effectiveness of the additives as grinding aids or auxiliaries for improving the material properties. In this case, the salt of the amino acid A can also be used in combination with pure or neutral amino alcohol A.

Also suitable, for example, are nitrate salts and/or sulfate salts of the amino alcohol A.

In another exemplary embodiment, the amino alcohol A is used as such. In this case the amino alcohol A is not a salt. This can facilitate the handling of the amino alcohol A.

As has been found, the molecular weight $M_W$ of the amino alcohol A can be in the range of 110-500 g/mol, for example, 110-300 g/mol, for example, 120-300 g/mol, for example, 130-200 g/mol. A molecular weight per alcohol group ($M_W$/number of OH) of the amino alcohol A can be in the range of 55-250 g/mol, for example, 60-150 g/mol, for example, 65-100 g/mol. Amino alcohols with such molecular weights exhibit an optimal effect. The molecular weights in this case are based on the amino alcohols A as such. Therefore the molecular weight of a counter-ion, if present, in the salt of the amino alcohol A is not taken into consideration.

For example, the amino alcohol A is a β-amino alcohol. This means, for example, that the amine group in the amino alcohol A is bound in β-position relative to the hydroxyl group or is bound to a β-carbon atom. If multiple alcohol groups are present, this is true, for example, for all these functional groups. Correspondingly, the hydroxyl groups of the alcohol group and the nitrogen atom of the amine group can be bound to two different and directly adjacent carbon atoms.

For example, $R^1$ and/or $R^2$ have at least one secondary alcohol group. For example, $R^1$ and/or $R^2$ each have precisely one alcohol group, which is also a secondary alcohol group. $R^1$ and $R^2$ are advantageously identical in this case. Such alkanol groups have proven advantageous in terms of the advantages according to the disclosure.

$R^1$ and/or $R^2$ may also contain primary or tertiary alcohol groups, for example, wherein more than one alcohol group per radical $R^1$ and/or $R^2$ may be present.

For example, $R^1$ and/or $R^2$ represents an alkanol group having 3 carbon atoms, for example, an isopropanol group. $R^1$ and $R^2$ can each represent an isopropanol group. Isopropanol groups can also be designated as 2-propanol groups. In this case, for example, the advantages according to the disclosure can be manifested particularly strongly.

$R^1$ and/or $R^2$ can represent an n-propanol group or a 1-propanol group. It is also possible to provide amino alcohol A or salts thereof in which, for example, $R^1$ is an n-propanol group and $R^2$ is an isopropanol group.

For example, $R^3$ is not an amino alcohol group. According to an additional advantageous embodiment, $R^3$ is a hydrocarbon radical that consists exclusively of C and H atoms. In this case, $R^3$ is a hydrocarbon radical without hetero atoms.

$R^3$ is advantageously an alkyl group, a cycloalkyl group, an alkyl aryl group or an aryl group.

For example, $R^3$ represents an alkyl group, for example, a saturated alkyl group. For example, $R^3$ is an alkyl group having 1-6 carbon atoms, for example, having 1-4 carbon atoms.

According to an exemplary embodiment, the amino alcohol A is an N-alkyldiisopropanolamine. An example is an N-alkyldiisopropanolamine with an alkyl group having 1-6 carbon atoms, for example, 1-4 carbon atoms.

For example, the amino alcohol A is N-methyldiisopropanolamine, N-ethyldiisopropanolamine, N-propyldiisopropanolamine or N-butyldiisopropanolamine. N-methyldiisopropanolamine is exemplary.

For example, the amino alcohol A and/or the salt thereof is used in a quantity of 0.001-1 wt %, for example, 0.02-0.5 wt %, based on the weight of the solid. In the case of use as a grinding aid, fractions of 0.005-0.4 wt %, for example, 0.02-0.3 wt %, are suitable. In the case of use as an auxiliary for improving the material properties of the solid, for example, for improving cement properties during the grinding of cementitious binders, fractions of 0.01-1 wt %, for example, 0.02-0.5 wt %, can be used.

As has been found, with such fractions the grinding efficiency is significantly improved and/or the material properties of the ground solid can be markedly increased. Other fractions, however, are basically also possible.

According to an additional exemplary embodiment, the amino alcohol A is used in combination with at least one other additive.

Basically, a large number of substances known to the person skilled in the art can be used here, for example, those that act as grinding aids and/or aids for improving the material properties of a solid, for example, a mineral solid. The additional additive can include one or more of the following representatives:
a) one or more additional amino alcohols and/or salts thereof, for example, those which differ from amino alcohol A and/or the salt thereof,
b) one or more glycols and/or glycol derivatives,
c) one or more polycarboxylates and/or polycarboxylate ethers.

Suitable polycarboxylate ethers in these instances are, for example, the polymers described in WO2005/123621 A1, which likewise serve as grinding aids.

Exemplary additional amino alcohols are, for example, trialkanolamines and/or dialkanolamines. Exemplary are triisopropanolamines, triethanolamines and/or diethanolamines.

Also exemplary as further amino alcohols are diisopropanolamine (DiPA) and/or N-methyldiethanolamine (MDEA). As has been found, the amino alcohols A according to the disclosure are highly compatible with these representatives of other additives in general. In this way, for example, flexible adaptation to special uses and/or cost optimization can be achieved in the preparation of the additives.

For example, combinations of N-methyldiisopropanolamine and diisopropanolamine can be used, for example, in the weight ratio of MDiPA:DiPA=2:1-1:5, for example, 1:1-1:3.

For example, combinations of N-methyldiisopropanolamine and N-methyldiethanolamine can be used, for example, in the weight ratio MDiPA:MDEA=2:1-1:3, for example, 2:1-1:1.

Advantageous glycols are, for example, diethylene glycol (DEG) and/or dipropylene glycol (DPG).

For example, combinations of N-methyldiisopropanolamine and diethylene glycol can be used, for example, in the weight ratio MDiPA:DEG=2:1-1:5, for example, 1:1-1:3.

For example, combinations of N-methyldiisopropanolamine and dipropylene glycol can be used, for example, in a weight ratio of MDiPA:DPG=2:1-1:5, for example, 1:1-1:3. Such combinations have advantageous properties as grinding aids and can be produced and used economically.

It may also be advantageous if the amino alcohol A and/or the salt thereof is used in combination with at least one additive, for example a concrete additive and/or a mortar additive. The at least one additive especially comprises a defoamer, a colorant, a preservative, a superplasticizer, a retardant, an air pore-forming agent, a shrinkage reducer and/or a corrosion inhibitor and/or mixtures thereof.

For example, the at least one additive is a superplasticizer. This can involve a polycarboxylate, for example, a polycarboxylate ether. For example, the superplasticizer is a comb polymer comprising a polycarboxylate backbone with polyether side chains bound to it. The side chains can be bound to the polycarboxylate backbone via ester, ether and/or amide groups.

Corresponding polycarboxylate ethers and their manufacturing methods are disclosed, for example, in EP 1 138 697 B1 on page 7, line 20 to page 8, line 50, and in the examples thereof or in EP 1 061 089 B1 on page 4, line 54 to page 5, line 38 and in the examples thereof. In a modification thereof, as described in EP 1 348 729 A1 on page 3 to page 5 and in the examples thereof, the comb polymer can be produced in a solid aggregation state. The disclosures of the above documents are incorporated herein by reference.

Such comb polymers are also commercially sold by Sika Schweiz AG under the trade name series ViscoCrete®.

If present, the superplasticizer can be present in a fraction of 0.01-6 wt %, for example, 0.1-4 wt %, for example, 0.5-3 wt %, relative to the solid, which can be a mineral binder. Because of the combination with the superplasticizer, the workability of a binder composition can be improved, and at the same time higher compressive strengths can be achieved.

An additional aspect of the present disclosure relates to a composition containing a solid, for example, a mineral and/or inorganic solid, for example, a mineral binder, and an amino alcohol A of Formula I as described above and/or a salt of the amino alcohol A. A composition containing a mineral binder or a binder composition can, for example, be present in dry form or as a fluid made up with makeup water or the stiffened binder composition. In this case, the amino alcohol A, for example, is present in the above-mentioned quantities.

In addition, an additive as described above can be present. The additive can include a superplasticizer, for example, a polycarboxylate ether. If present, the superplasticizer can account for a fraction of 0.01-6 wt %, for example, 0.1-4 wt %, for example, 0.5-3 wt %, based on the mineral binder.

In a further exemplary embodiment, a binder composition also contains solid aggregates, for example, gravel, sand and/or stone aggregate. Corresponding compositions can be used, for example, as mortar mixtures or concrete mixtures.

For example, the binder composition also contains water, wherein a weight ratio of water to mineral binder can be in the range of 0.25-0.8, for example, 0.3-0.6, for example, 0.35-0.5. Such binder compositions can be processed directly as mortar or concrete mixtures.

An additional aspect of the present disclosure relates to a molded article obtainable by curing a binder composition as described above after addition of water. The molded object produced in this way can have almost any shape and, for example, can be part of a construction object, such as a building, masonry or a bridge.

Furthermore the present disclosure relates to a method for producing a composition containing a solid, for example, a mineral and/or inorganic solid. In this process, an amino alcohol A described as above according to Formula I and/or a salt of the amino alcohol A is mixed with a solid, for example, a mineral binder, for example, a cementitious binder, and ground. The solid can be present as described above and especially can contain the above-mentioned hydraulic, latently hydraulic and/or pozzolanic binder. Likewise the solid can contain inert additives. Furthermore, the above-mentioned other additives and/or admixtures may be mixed in the corresponding quantities.

Additional advantageous embodiments of the disclosure will be apparent to the person skilled in the art based on the exemplified embodiments that follow.

EXAMPLES

1. Additives Used

The following additives A1-A31 were used for the exemplary embodiments (Table 1):

TABLE 1

| Designation | Composition |
|---|---|
| A1 | N-Methyldiisopropanolamine (MDiPA; 40 wt % in $H_2O$) |
| A2 | Triisopropanolamine (TiPA; 40 wt % in $H_2O$) |
| A3 | Diethanolamine (DEA; 40 wt % in $H_2O$) |
| A4 | Triethanolamine (TEA; 40 wt % in $H_2O$) |
| A5 | 1:1-mixture of TiPA and MDiPA (40 wt % in $H_2O$) |
| A6 | 1:1-mixture of DEA and MDiPA (40 wt % in $H_2O$) |
| A7 | 1:1-mixture of TEA and MDiPA (40 wt % in $H_2O$) |
| A8 | Diethylene glycol (DEG; 40 wt % in $H_2O$) |
| A9 | Diisopropanolamine (DiPA; 40 wt % in $H_2O$) |
| A10 | Dipropylene glycol (DPG; 40 wt % in $H_2O$) |
| A11 | Glycerol (40 wt % in $H_2O$) |
| A12 | 1:1-mixture of MDiPA and DEG (40 wt % in $H_2O$) |
| A13 | 1:3-mixture of MDiPA and DEG (40 wt % in $H_2O$) |
| A14 | 1:1-mixture of MDiPA and DPG (40 wt % in $H_2O$) |
| A15 | 1:3-mixture of MDiPA and DPG (40 wt % in $H_2O$) |
| A16 | 1:1-mixture of MDiPA and DiPA (40 wt % in $H_2O$) |
| A17 | 1:3-mixture of MDiPA and DiPA (40 wt % in $H_2O$) |
| A18 | 1:3:1.75-mixture of MDiPA, DiPA and acetic acid (AcOH) (40 wt % in $H_2O$) |
| A19 | 1.5:0.5:1:1-mixture of MDiPA, TEA, DEG and glycerol (40 wt % in $H_2O$) |
| A20 | 2:1:1.2:1-mixture of MDiPA, TEA, AcOH and DEG (40 wt % in $H_2O$) |
| A21 | 2:1:1-mixture of MDiPA, TEA and DEG (40 wt % in $H_2O$) |
| A22 | N-Methyldiethanolamine (MDEA; 40 wt % in $H_2O$) |
| A23 | 1:1-mixture of MDiPA and MDEA (40 wt % in $H_2O$) |
| A24 | Viscocrete-20 HE (polycarboxylate ether, available from Sika Schweiz AG; (40 wt % in $H_2O$) |
| A25 | 1:3-mixture of Viscocrete-20 HE and MDiPA (40 wt % in $H_2O$) |
| A26 | 1:2:1-mixture of Viscocrete-20 HE, MDiPA and DEG (40 wt % in $H_2O$) |
| A27 | N-Ethyldiisopropanolamine (EDiPA; 40 wt % in $H_2O$) |
| A28 | N-n-Propyldiisopropanolamine (PDiPa; 40 wt % in $H_2O$) |
| A29 | N-Isopropyldiisopropanolamine (iPDiPA; 40 wt % in $H_2O$) |
| A30 | N-Butyldiisopropanolamine (BDiPA; 40 wt % in $H_2O$) |
| A31 | N-Octyldiisopropanolamine (ODiPA; 40 wt % in $H_2O$) |

All of the substances A1-A26 listed in Table 1 are commercially available in pure form from various suppliers (purity>97%). The additives A27-A31 were prepared, starting from ethylamine, n-propylamine, i-propylamine, n-butylamine and n-octylamine, respectively, by propoxylation with propylene oxide in a manner known per se.

In this case, the 1:1 mixtures each consist of a mixture with equal parts by weight of the substances indicated. Correspondingly, the additional mixtures in each case consist of the substances mentioned, present in the indicated weight ratios.

2. Grinding Experiments

To determine the effectiveness of the various additives A1-A7 as grinding aids, in each of the grinding experiments M1-M7 300 g of a cement clinker (Vigier) were ground under identical conditions with the additives indicated in Table 2 using laboratory ball mills. Experiment M0 is a reference sample without additive. The quantities of A1-A7 added in each case amounted to 0.02 wt % (quantity of pure amino alcohol without $H_2O$, based on cement clinker). The grinding time was kept constant in all grinding experiments. The temperature of the material being ground was in the range of 94.9-99.8° C.

After a grinding process had been performed, the fineness according to Blaine and the screen residue of particles larger than 32 μm in size (in wt % based on all particles) were determined with a 32 μm screen in analogy to standard EN 196-6 (May 2010). The results were also verified by laser granulometry.

Table 2 gives an overview of the grinding experiments performed and the corresponding results.

TABLE 2

| Experiment | M0 | M1 | M2 | M3 | M4 | M5 | M6 | M7 |
|---|---|---|---|---|---|---|---|---|
| Additive | — | A1 | A2 | A3 | A4 | A5 | A6 | A7 |
| Fineness [cm²/g] | 1985 | 2905 | 2745 | 2745 | 2515 | 2860 | 2875 | 2815 |
| Screen residue >32 μm [wt %] | 39.4 | 26.5 | 28.7 | 29.5 | 32.1 | 27.3 | 27.0 | 27.9 |

It is apparent from Table 2 that the highest fineness and the lowest screen residue are obtained when additive A1 is used (MDiPA; experiment M1). Additives A2-A4 provide an improvement compared with the reference experiment without additive (M0), but clearly the results are inferior to those with additive A1. Additives A5-A7 (experiments M5-M7), which on the whole represent mixtures of MDiPA and one of the additives A2-A4, give better results than additives A2-A4 alone.

Tables 2a, 2b, 2c and 2d give an overview of the results of additional grinding experiments (MR1, M8-M27), performed with additives A1 and A8-A26. The grinding experiments M8-M27 were performed as described for the grinding experiments M1-M7, but the grinding times were prolonged. This results in more finely ground cement. The dosages of the additives A8-A26 all amounted to 0.02 wt % (total quantity of pure active substances without $H_2O$, based on cement clinker). MR1 is a blank without addition of additives.

TABLE 2a

| Experiment | MR1 | M8 | M9 | M10 | M11 | M12 |
|---|---|---|---|---|---|---|
| Additive | — | A1 | A8 | A9 | A10 | A11 |
| Fineness [$cm^2/g$] | 2853 | 3776 | 3575 | 3667 | 3594 | 3361 |
| Screen residue >32 μm [wt %] | 26.0 | 17.2 | 19.2 | 17.8 | 17.9 | 21.2 |

TABLE 2b

| Experiment | M13 | M14 | M15 | M16 | M17 | M18 |
|---|---|---|---|---|---|---|
| Additive | A12 | A13 | A14 | A15 | A16 | A17 |
| Fineness [$cm^2/g$] | 3650 | 3668 | 3686 | 3704 | 3758 | 3740 |
| Screen residue >32 μm [wt %] | 17.5 | 18.3 | 18.1 | 17.8 | 17.4 | 17.3 |

TABLE 2c

| Experiment | M19 | M20 | M21 | M22 | M23 | M24 |
|---|---|---|---|---|---|---|
| Additive | A18 | A19 | A20 | A21 | A22 | A23 |
| Fineness [$cm^2/g$] | 3686 | 3622 | 3489 | 3556 | 3176 | 3301 |
| Screen residue >32 μm [wt %] | 17.4 | 18.1 | 18.9 | 18.4 | 22.3 | 21.7 |

TABLE 2d

| | Experiment | | |
|---|---|---|---|
| | M25 | M26 | M27 |
| Additive | A24 | A25 | A26 |
| Fineness [$cm^2/g$] | 3322 | 3537 | 3603 |
| Screen residue >32 μm [wt %] | 20.2 | 18.0 | 18.3 |

It is apparent from Tables 2a-2d that amino alcohols according to the disclosure, for example, MDiPA, can be combined quite well with other grinding agents or substances. The addition of AcOH for odor reduction (Additives A18 and A20) also does not entail any significant losses in terms of grinding efficiency. Thus, for example, it is possible to produce grinding aid formulations which are adapted to various circumstances with regard to function and economy.

Table 2e gives an overview of additional results of grinding experiments (MR2, M28-M33) performed with the additives A1 and A27-A31. The grinding experiments M28-M33 were once again performed as described in the grinding experiments M1-M7, but the grinding time was prolonged and the dosages of the additives were increased to 0.1 wt % (quantity of pure amino alcohol without $H_2O$, based on cement clinker). This results in even more finely ground cement. MR2 is a blank without addition of additive.

TABLE 2e

| Experiment | MR2 | M28 | M29 | M30 | M31 | M32 | M33 |
|---|---|---|---|---|---|---|---|
| Additive | — | A1 | A27 | A28 | A29 | A30 | A31 |
| Fineness [$cm^2/g$] | 2845 | 4254 | 4243 | 4200 | 4202 | 4190 | 4182 |
| Screen residue >32 μm [wt %] | 25.9 | 14.2 | 14.3 | 14.2 | 14.6 | 14.7 | 14.6 |

The additives A1 and A27-31 are thus all effective grinding aids which significantly improve the grinding efficiency. It is recognizable here that the effectiveness of the additives tends to decrease with increasing chain length of the alkyl groups.

3. Mortar Experiments

The effectiveness of additive A1 as a cement improver was also investigated. For this purpose, starting from identical cement clinker (Vigier), three cement mixtures Z0-Z2 each of different fineness were produced. Z0 is a reference sample which was ground without the addition of an additive. In the cement mixtures Z1 and Z2, additive A1 was added to the cement clinker before the grinding process in each case at the dosages shown in Table 2 (quantity of pure amino alcohol without $H_2O$, based on cement clinker) and ground with it. The cement mixtures Z0-Z2 were then used as binder in mortar mixtures MM1-MM3.

To make up the mortar mixtures MM1-MM3, sand, limestone filler and in each case one of the cement mixtures Z0-Z2 was dry-mixed in a Hobart mixer for 1 minute. Within 30 seconds the make-up water, in which a superplasticizer (Sika Viscoconcrete 1.0 wt % based on binder) was dispersed, was added and mixed for an additional 2.5 minutes. The total wet mixing time took 3 minutes. The water/cement value (w/c value) was 0.4.

The compressive strength and the bending tensile strengths of the mortar mixtures MM1-MM3 were determined 1, 2, 7 and 28 days after the mortar mixtures were made up. The compressive strength (in N/mm$^2$) was determined on prisms (40×40×160 mm) according to standards EN 12390-1 to 12390-4. The bending tensile strength was measured with corresponding prisms as test samples according to standard 12390-5 (1-point load application in the center).

The mortar mixtures have the dry compositions and properties after making up with water (w/z=0.4) described in Table 3.

out H$_2$O, based on cement clinker). The constant fineness in these experiments was controlled by a suitable selection of the grinding time.

Then, mortar mixtures MM10-M16 were produced with the cement mixtures Z10-Z16 produced in this way. The preparation was performed in the same manner as described above for the mortar mixtures MM1-MM3 (Table 3). Then, as described above, the early compressive strengths of the mortar mixtures were determined after 1 day. Table 4 presents a summary of the corresponding results. The line "A" here indicates the percentage change in early compressive strength relative to the reference mortar mixture MM10 (based on cement mixture Z10).

TABLE 4

|  | Cement mixture | | | | | | |
| --- | --- | --- | --- | --- | --- | --- | --- |
|  | Z10 | Z11 | Z21 | Z13 | Z14 | Z15 | Z16 |
| Additive (addition before grinding process) | — | A1 | A27 | A28 | A29 | A30 | A31 |
| Mortar mixture | MM10 | MM11 | MM12 | MM13 | MM14 | MM15 | MM16 |
| Compressive strength 1 d [MPa] | 34.1 | 40.1 | 37.6 | 34.7 | 33.7 | 35.9 | 30.0 |
| Δ [%] | 0 | 18 | 10 | 4 | −1 | 5 | −12 |

TABLE 3

|  | Mortar mixture | | |
| --- | --- | --- | --- |
|  | MM1 | MM2 | MM3 |
| Cement | Z0 | Z1 | Z2 |
| Quantity used [g] | 750 | 750 | 750 |
| Blaine fineness [cm$^2$/g] | 3500 | 3370 | 3410 |
| Screen residue >32 μm [wt %] | 15.2 | 8.6 | 11.0 |
| Additive (added before grinding process) | None | A1 | A1 |
| Dosage based on clinker [wt %] | 0 | 0.1 | 0.2 |
| Limestone filler |  | 141 g |  |
| Sand 0-1 mm |  | 738 g |  |
| Sand 1-4 mm |  | 1107 g |  |
| Sand 4-8 mm |  | 1154 g |  |
| Compressive strength [MPa] |  |  |  |
| 1 day | 19.2 | 18.3 | 17.4 |
| 2 days | 29.9 | 31.7 | 30.9 |
| 7 days | 46.8 | 53.1 | 51.6 |
| 28 days | 58.4 | 68.0 | 67.0 |
| Bending tensile strength [MPa] |  |  |  |
| 1 day | 3.6 | 3.5 | 3.4 |
| 2 days | 5.7 | 4.9 | 5.0 |
| 7 days | 6.4 | 7.3 | 6.5 |
| 28 days | 7.4 | 7.5 | 7.4 |

Table 3 shows that the addition of additive A1 in the mortar experiments MM2 and MM3 already leads to higher compressive strengths and comparable bending tensile strengths in comparison with the reference sample after 2 days despite the cement being less finely ground. Thus additive A1 acts as a cement improver, which makes it possible to improve the compressive strength of cement significantly at lower degrees of grinding.

In an additional series of experiments, starting from identical cement clinker (Vigier), with one of the additives A1, A27-A31 in each case and without additive (as reference) several cement mixtures Z10-Z16 with constant Blaine fineness of approximately 4200 cm$^2$/g were produced (see Table 4). The dosages during the grinding processes here amounted to a constant 0.1 wt % (quantity of pure amino alcohol with- It is apparent from Table 4 that the additives A1, A27, A28 and A30 produce significant increases in the early compressive strengths and simultaneously are effective grinding aids (see Table 2e). This is especially true, for example, with regard to compositions with the additives A1 (MDiPA) and A27 (EDIPA). Because of the constant fineness of the cement mixtures used, an influence of this factor on the compressive strengths can be ruled out.

The embodiments described above, however, are only to be understood as illustrative examples, which can be modified as necessary within the scope of the disclosure.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A composition, comprising:
   a solid comprising a cementitious binder, a cement clinker, or a combination thereof, and
   an amino alcohol A and/or a salt of the amino alcohol A, as an additive in the grinding of the solid,
   wherein the amino alcohol A is N-methyldiisopropanolamine.

2. The composition according to claim 1, wherein the amino alcohol A and/or the salt thereof is a grinding aid and improves a grinding efficiency in the grinding of the solid.

3. The composition according to claim 1, wherein the solid is a cementitious binder, and wherein the amino alcohol A and/or the salt thereof is a grinding aid and improves a cement property of the solid.

4. The composition according to claim 1, wherein the amino alcohol A and/or the salt thereof is a cement improver for increasing a strength class of a cement.

5. The composition according to claim 1, wherein the amino alcohol A and/or the salt thereof increases a compressive strength and/or a bending tensile strength of mortar and/or concrete mixtures.

6. The composition according to claim 1, wherein the amino alcohol A and/or the salt thereof improves an early compressive strength of a mineral binder and/or a mortar mixture and/or a cement mixture.

7. The composition according to claim 1, wherein the amino alcohol A and/or the salt thereof is added to the solid before and/or during a grinding process of the solid.

8. The composition according to claim 1, wherein the amino alcohol A and/or a salt of the amino alcohol A is a $C_1$ to $C_3$ carboxylic acid salt of the amino alcohol A.

9. The composition according to claim 1, wherein the amino alcohol A is present in a quantity of 0.001-1 wt %, based on the weight of the solid.

10. The composition according to claim 1, wherein the solid contains at least 5 wt %, of the cementitious binder, the cement clinker, or the combination thereof.

11. The composition according to claim 1, wherein the solid contains 5-95 wt % of a latently hydraulic and/or pozzolanic binder.

12. A molded article obtained by curing the composition according to claim 1.

13. A method for producing the composition according to claim 1, the method comprising:
mixing the amino alcohol A and/or a salt of the amino alcohol A with the solid, wherein the solid comprising a cementitious binder, a cement clinker, or a combination thereof, wherein the amino alcohol A is N-methyldiisopropanolamine, and
grinding the solid,
wherein the mixing occurs before and/or during the grinding.

14. A method for grinding a solid, the method comprising:
grinding the composition according to claim 1.

15. The composition according to claim 1, wherein the amino alcohol A and/or a salt of the amino alcohol A is an acetic acid salt of the amino alcohol A.

16. The composition according to claim 1, wherein the amino alcohol A is present in a quantity of 0.02-0.5 wt %, based on the weight of the solid.

17. The composition according to claim 1, wherein the solid contains at least 25 wt % of the cementitious binder, the cement clinker, or the combination thereof.

18. The composition according to claim 1, wherein the solid contains ≥95 wt % of the cementitious binder, the cement clinker, or the combination thereof.

19. The composition according to claim 1, wherein the solid is a cement and/or cement clinker.

20. The composition according to claim 1, wherein the solid contains 5-65 wt % of a latently hydraulic and/or pozzolanic binder.

21. The composition according to claim 20, wherein the latently hydraulic and/or pozzolanic binder is slag and/or fly ash.

22. The composition according to claim 1, wherein the solid contains cement clinker.

23. The composition according to claim 1, further comprising diisopropanolamine.

24. The composition according to claim 23, wherein a weight ratio of N-methyldiisopropanolamine to diisopropanolamine is in a range of 2:1 to 1:5.

25. The composition according to claim 1, further comprising N-methyldiethanolamine.

26. The composition according to claim 25, wherein a weight ratio of N-methyldiisopropanolamine to N-methyldiethanolamine is in a range of 2:1 to 1:3.

27. The composition according to claim 1, further comprising diethylene glycol.

28. The composition according to claim 27, wherein a weight ratio of N-methyldiisopropanolamine to diethylene glycol is in a range of 2:1 to 1:5.

29. The composition according to claim 1, further comprising dipropylene glycol.

30. The composition according to claim 29, wherein a weight ratio of N-methyldiisopropanolamine to dipropylene glycol is in a range of 2:1 to 1:5.

* * * * *